(No Model.)
H. O. LOTHROP.
MACHINE FOR CUTTING TUBES.
No. 290,695. Patented Dec. 25, 1883.
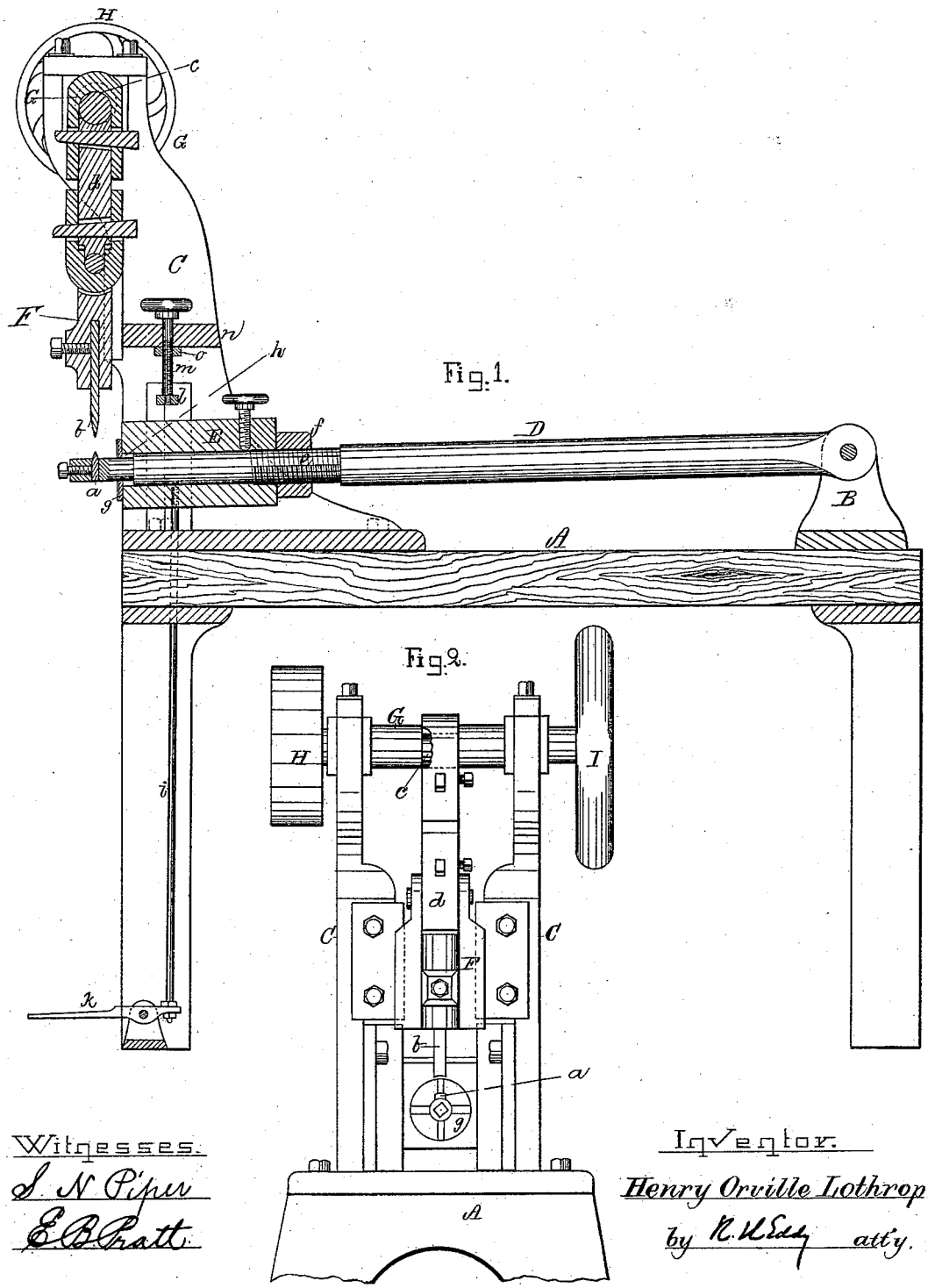

UNITED STATES PATENT OFFICE.

HENRY ORVILLE LOTHROP, OF BOSTON, MASSACHUSETTS.

MACHINE FOR CUTTING TUBES.

SPECIFICATION forming part of Letters Patent No. 290,695, dated December 25, 1883.

Application filed August 1, 1883. (No model.)

*To all whom it may concern:*

Be it known that I, HENRY ORVILLE LOTHROP, of Boston, in the county of Suffolk, of the Commonwealth of Massachusetts, have invented a new and useful improvement in machinery for cutting metallic tubes transversely into sections, for the conversion of such tubes into ferrules for tool-handles, &c.; and I do hereby declare the same to be described in the following specification and represented in the accompanying drawings, of which—

Figure 1 is a longitudinal section, and Fig. 2 a front end elevation, of a machine embodying my invention, the nature of which is duly defined in the claims hereinafter presented.

This machine is specially adapted to the separation into short tubes of a tube formed by spirally winding a wire about a mandrel or former and having the coils close together and connected by solder. The machine can also be employed to advantage on various tubes otherwise made.

In the drawings, A denotes a table for supporting the two standards B and C for sustaining the main operative parts of the machine. To the standard B an arm, D, is pivoted, so as to be capable of being moved upward and downward. There is fixed in such arm, near its outer end, what may be termed the "auxiliary" chisel or cutter $a$, to operate with another or vertically-reciprocating cutter or chisel, $b$. This latter cutter is supported in a carrier, F, adapted to the standard C so as to slide vertically therein. Over this carrier is a horizontal shaft, G, provided with an eccentric, $c$, adapted to the carrier F by means of a connection, $d$, such as will cause the eccentric during each revolution of the shaft to move the carrier upward and downward. There are to the shaft G a driving-pulley, H, and a fly-wheel, I. Furthermore, there slides lengthwise on the arm D a block, E, which, by means of a screw, $e$, and a nut, $f$, on the arm, becomes adjustable nearer to or farther from the cutter $a$, as circumstances may require. A small metallic washer, $g$, grooved diametrically on its outer surface, is placed against the block E and concentrically on the arm D, where such arm is the smallest in diameter, this washer being to prevent a tube while being cut from entering the arm-passage $h$ in the block E. From the said block a rod, $i$, extends downward, and is connected to the shorter arm of a pedal, $k$, arranged as represented. The said block E, suitably guided in rising with the arm D, brings up against a vertically-adjustable stop, $l$. This stop is a small disk fixed on the lower end of a screw, $m$, that screws through a stationary cross-bar, $n$, and is provided with a set-nut, $o$, arranged as represented. The object of the adjustable stop is to arrest the upward movement of the auxiliary cutter in order that its cutting-edge may, conjointly with the main cutter, cut through a tube without coming into contact, to the injury of the two cutting-edges of such cutters.

In using the machine, a tube to be severed is placed on the auxiliary cutter, so that the bore of such tube may rest on the cutting-edge of such cutter and the end of the tube against the washer $g$. This having been done, the attendant, holding the tube with his hands, forces, by means of his foot on the pedal $k$, the block E and arm D upward, and while the chisel $b$ is reciprocated vertically he is to slowly revolve the tube on the chisel $a$, so as to cause such tube by means of the two chisels to be cut through in a path transversely of it.

I claim—

1. The combination of the adjustable slide-block and the auxiliary cutter and their vertically-movable supporting-arm provided with mechanism for operating it, as described, with the main cutter and mechanism for actuating it, substantially as set forth, all being adapted and for use essentially in manner and for the purpose as set forth.

2. The combination of the adjustable stop $l$ with the adjustable slide-block, the auxiliary cutter, vertically-movable arm, and the main cutter, arranged and provided with mechanism for operating them, substantially as set forth.

HENRY ORVILLE LOTHROP.

Witnesses:
R. H. EDDY,
E. B. PRATT.